United States Patent [19]

Hung et al.

[11] Patent Number: 5,055,984
[45] Date of Patent: Oct. 8, 1991

[54] SOLAR RECHARGEABLE LIGHT

[75] Inventors: Kung C. Hung, Tsian Lung Tau, Hong Kong; Leo Milewicz, Jr., Irving, Tex.; Donald L. Rohrs, Overland Park, Kans.

[73] Assignee: The Brinkmann Corporation, Dallas, Tex.

[21] Appl. No.: 392,722

[22] Filed: Aug. 11, 1989

[51] Int. Cl.⁵ .................................................. F21L 7/00
[52] U.S. Cl. .................................. 362/183; 362/431; 362/145; D26/67
[58] Field of Search .............. 362/183, 145, 153, 285, 362/287, 372, 431; 136/291; D26/67-71

[56] References Cited

U.S. PATENT DOCUMENTS

| | | | |
|---|---|---|---|
| D207,273 | 3/1967 | Muller et al. | D48/31 |
| D291,926 | 9/1987 | Schlepp | D26/67 |
| 2,919,353 | 12/1959 | Paradise | 250/239 |
| 3,869,604 | 3/1975 | Prochnow | 362/285 |
| 4,281,369 | 7/1981 | Batte | 362/183 |
| 4,450,507 | 5/1984 | Gordin | 362/431 |
| 4,481,562 | 11/1984 | Hickson | 362/183 |
| 4,486,820 | 12/1984 | Baba et al. | 362/183 |
| 4,751,622 | 6/1988 | Williams | 362/183 |
| 4,835,664 | 5/1989 | Wen | 362/183 |
| 4,841,416 | 6/1989 | Doss | 362/183 |

*Primary Examiner*—Ira S. Lazarus
*Assistant Examiner*—D. M. Cox
*Attorney, Agent, or Firm*—Pretty, Schroeder, Brueggemann & Clark

[57] ABSTRACT

A solar rechargeable light has a lamp for illuminating a selected area such as the ground or a wall. A base is adapted to support the lamp in a fixed position to illuminate the selected area. An electrical storage device and power supply is electrically coupled to the lamp. A solar panel is electrically coupled to the electrical storage device for charging the storage device when the solar panel is exposed to light, wherein current from the storage device energizes the lamp, and wherein the solar panel is moveable relative to the base so that the orientation of the solar panel is substantially independent of an orientation of the lamp relative to the selected area.

1 Claim, 2 Drawing Sheets

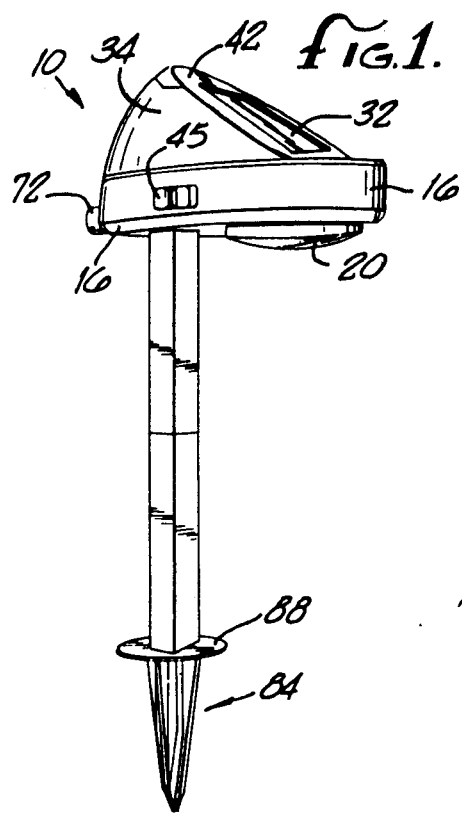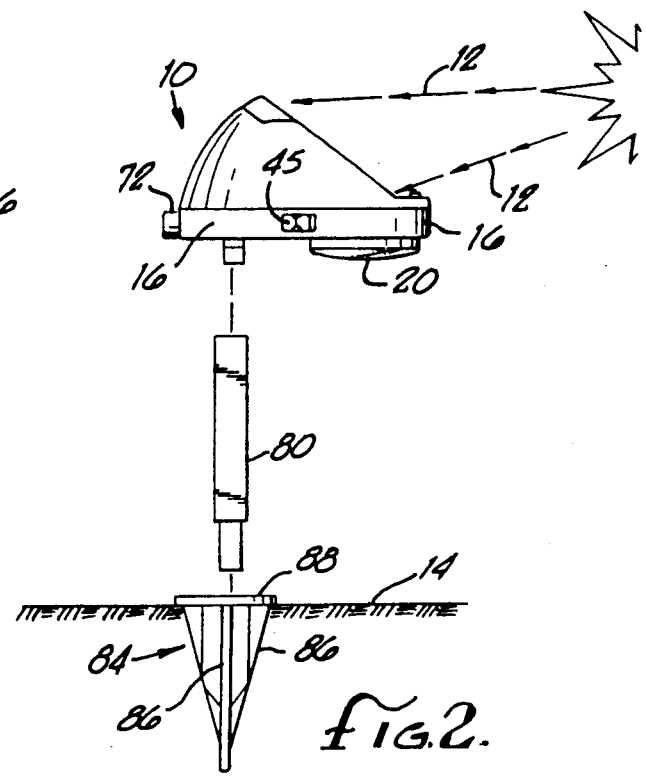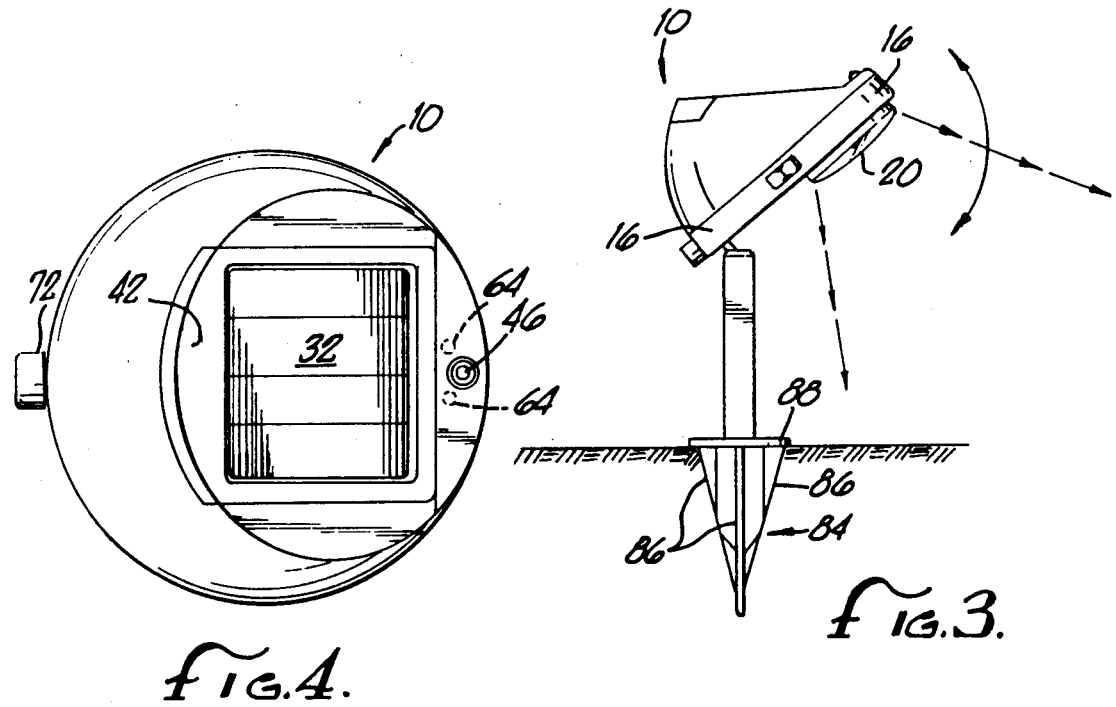

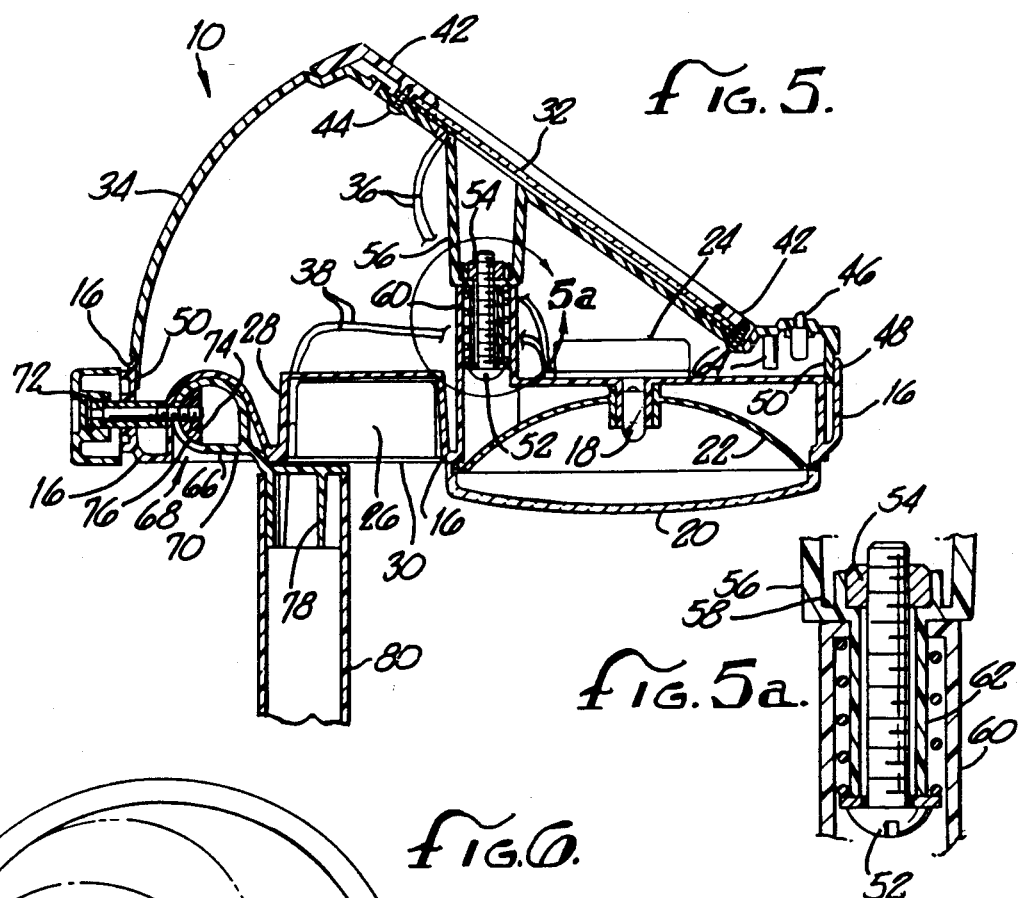
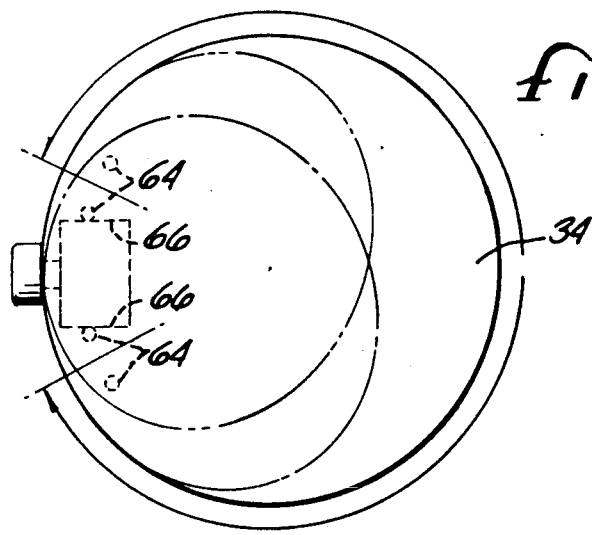
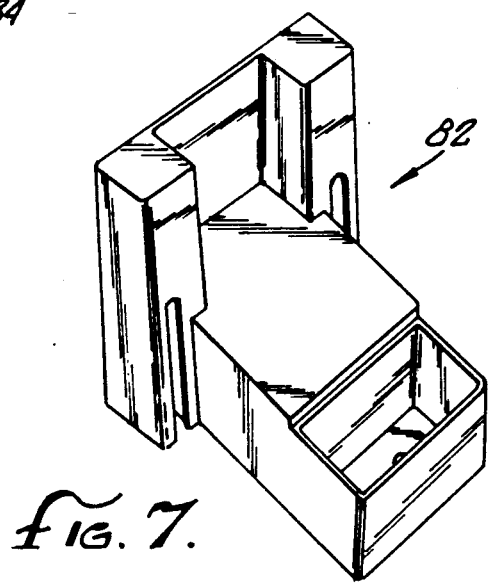

SOLAR RECHARGEABLE LIGHT

BACKGROUND OF THE INVENTION

1. Field Of The Invention

The present invention relates to solar rechargeable lights.

2. Related Art

Yard and walkway lights are well known for providing illumination of sidewalks, driveways, yards, and so forth. These lights typically are powered through underground wiring or gas supply. To eliminate the need for such underground power supply, solar powered lights have been used which can be selectively placed irrespective of underground power supplies, as long as there is sufficient illumination of the solar panel to charge a battery sufficiently to power the light when darkness sets in.

Such solar powered lights typically have been mounted on posts stuck in the ground and have had the light bulb placed on the bottom of the housing of the solar light. The solar panel for the light sloped downward on a side of the housing from the top of the housing to the bottom. With this arrangement, however, placement of the light in the desired location for optimum illumination of a selected area necessarily determined the orientation of the sloped solar panel. On the other hand, if the light was positioned so as to optimize collection of solar rays in the solar panel, the selected area for illumination was not always properly lighted. There has been a need, therefore, for a solar powered light wherein the orientation of the light is independent of the orientation of the solar panel.

Prior solar powered lights were rigidly fixed to the standard or post on which the light housing was mounted. As a result, the light source always pointed down to illuminate the ground underneath the light. The light would illuminate a circular area centered around the solar powered light. The rigid structure of the light did not allow reorientation of the light to illuminate a different area. There also has been, therefore, a need for a solar powered light which can be adjusted for illuminating any number of selected areas from the same location.

Prior solar lights were placed in the ground merely by sticking the support stake in the ground. Whenever the surrounding area was to be mowed or cleaned, the light would be left in place, in which case it could be hit or bumped and possibly damaged or the area next to the stake could not be adequately maintained, or the stake could be removed from the ground. If the stake were removed from the ground, the hole is often widened through the action of withdrawing and replacing the stake, making the repositioning of the light unstable. Therefore, there has been a further need for a solar powered light which can be placed in the ground and repeatedly removed to allow mowing or cleaning in the surrounding area without loosening the surrounding soil with repeated removal of the stake.

SUMMARY OF THE INVENTION

Briefly, and in general terms, the present invention resides in a solar rechargeable light which the orientation of the light source is independent of the orientation of the solar panel, movement of the light source is allowed to change the area of illumination, and the light can be quickly and easily removed from the ground and replaced after mowing, trimming and so forth.

In accordance with the present invention, a solar rechargeable light has a lamp for illuminating a selected area such as the ground or a wall. A base is adapted to support the lamp in a fixed position to illuminate the selected area. An electrical storage device and power supply is electrically coupled to the lamp. A solar panel is electrically coupled to the electrical storage device for charging the storage device when the solar panel is exposed to light, wherein current from the storage device energizes the lamp, and wherein the solar panel is moveable relative to the base so that the orientation of the solar panel is substantially independent of an orientation of the lamp relative to the selected area. With this invention, the lamp and the solar panel can be oriented independently of one another to optimize the collection of solar rays and still provide the desired illumination at the same time.

In a preferred embodiment, the solar panel is rotatable about an axis relative to the base through an angle of only less than 360°. This minimizes the possibility of entanglement of any wires or conductors which may be used in the solar rechargeable light. Additionally, the base may include a mount which is releasably fixed to the base so that the base and lamp can be adjusted in position relative to the support. This would allow, for example, the light to be tilted for illuminating a different area or for adjusting the solar panel angle to present the best panel angle at the particular latitude.

In a further preferred embodiment, the solar rechargeable light can be mounted on a light stand having an end which can be placed in a ground stake embedded in the ground. The light stand can be easily removed from the ground stake to allow mowing or trimming. The light stand can then be easily reinserted into the ground stake without disturbing the surrounding soil so that the light is in the same stable position and orientation as previously.

BRIEF DESCRIPTION OF THE DRAWINGS

FIG. 1 is a perspective view of a solar rechargeable light supported by a light stand and ground stake.

FIG. 2 is a side elevation exploded view of the solar rechargeable light shown in FIG. 1.

FIG. 3 is a side elevation view of the solar rechargeable light of FIG. 1 showing the light tilted.

FIG. 4 is a top plan and sectional view of the light of FIG. 1.

FIG. 5 is a vertical cross-sectional view of the light of FIG. 1.

FIG. 5a is a detailed vertical cross-sectional view of a portion of the light of FIG. 5 showing concentric pivot cylinders.

FIG. 6 is a plan view of the light of FIG. 1 depicting the full extent of rotation of a solar panel.

FIG. 7 is a perspective view of a wall mounting bracket for use with the light of FIG. 1.

DESCRIPTION OF THE PREFERRED EMBODIMENTS

In accordance with the invention, a solar rechargeable light is described which provides orientation of the light source independent of the orientation of the solar collector for the light so that the light can be positioned as desired while still allowing orientation of the solar panel for optimum efficiency. Considering FIGS. 1, 2 and 5, a solar rechargeable light 10 receives light rays 12 (FIG. 2) from the sun or other suitable light source and converts the light rays to electrical energy for storage and subsequent use to energize the light source for illuminating a selected area, such as the ground 14. A base 16 forms the lower part of a housing for the rechargeable light. A lamp or lamp bulb 18 is mounted in the base for producing light to shine below the base through a lens 20 for illuminating a selected area such as the ground or a wall. The lamp bulb may be an incandescent light source, or a gas-filled, fluorescent or other suitable light source. The lens 20 transmits the light, part of which light is reflected from a reflector 22 also mounted in the base 16. The lens holds the reflector in an opening in the bottom of the base through a bayonet lock mount or other suitable means for removeably retaining the lens.

The bulb is electrically coupled through an appropriate circuit 24, to be described more fully below, to an electrical storage device and power supply or battery 26 so that current from the power supply can energize the lamp bulb. The battery may be, for example a gelled electrolyte lead acid battery or NiCad battery, for example. The battery 26 is retained in a battery compartment 28 formed in the bottom of the base using a cover 30 fastened to the bottom of the base.

A solar panel 32 is mounted on an upper housing or cover 34 relative to the base 16 so as to be slanted or sloped for receiving light rays and converting the energy of the light rays to electrical energy. The solar panel may also be used as light/darkness indicator for determining when it is dark enough to turn the lamp bulb on. The solar panel is preferably a semi-crystalline solar panel well known in the art for receiving and converting light rays to electrical energy, such as may be used for charging a storage battery. The solar panel is electrically coupled to the battery 26 through the electrical circuit 24 by means of suitable conductors 36 and 38 for charging the storage device when the solar panel is exposed to light.

The solar panel is placed on a sloped surface on the cover 34 and sandwiches a water seal cover or gasket 40 against the outer top surface of the solar panel to keep water out of the housing under normal conditions. The solar panel and gasket are held in place by a panel cover 42 having lugs or clips 44 passing through slots in the gasket around the edges of the gasket and through respective slots in the cover 38 to clip the underside of the cover and thereby retain the gasket and solar panel in place. A suitable opening is formed in the panel cover to allow light rays to reach the solar panel.

A switch 45 is mounted on the outside of the base for selecting between an "Automatic" configuration for circuit 24 and an "Off" configuration. In the "Off" configuration, the light will be off at all times while still allowing charging of the battery by the solar panel. In the "Automatic" configuration, the solar panel charges the battery during the day while the light is off, and the light comes on at night using current stored in the battery. Alternatively, the "Off" configuration can disconnect the battery from both the solar panel and the lamp bulb.

The electrical circuit 24 is any suitable circuit well known to those skilled in the art for accomplishing the functions described herein. The circuit passes current from the solar panel to the battery for charging the battery during the day while light is absorbed by the solar panel. The electrical circuit includes a circuit for determining when darkness has set in. In one embodiment, the darkness sensor circuit is coupled to the solar panel and a diode is provided in the circuit between the solar panel and battery to prevent current from passing in the opposite direction from the battery to the solar panel during darkness, resulting in a gradual low level drain. The electrical circuit also includes a further circuit for testing the charge level of the battery. When the charge level on the battery approaches b 30% of maximum, due to continuous energization of the lamp bulb, the electrical circuit opens the circuit between the battery and the lamp bulb to prevent further draining of the battery. The battery can then be recharged. A further circuit is included for keeping an open circuit between the battery and the lamp bulb when there is sufficient ambient light, for example from the sun, to illuminate the solar panel. The electronic circuit is preferably moisture resistant.

In the disclosed embodiment, a low battery indicator 46 is mounted in the cover 38 centered and in front of the solar panel (FIG. 4). The indicator 46 may be an LED coupled to the electrical circuit 24 and is illuminated when the battery charge level approaches 30% of maximum. Alternatively, the battery indicator may be omitted.

In the disclosed embodiment, the base 16 and the cover 38 are circular in plan view and engage at their circumferential edges in an overlapping junction around the circumferences thereof. The inside diameter of the rim 48 of the base is approximately the same as the outside diameter of the circular rim 50 of the cover which slidingly contacts the inside surface of the rim of the base. The rim of the base abuts against a ledge extending outwardly from the rim of the cover so that the ledge rests on the rim of the base. This engagement between the base and the cover allows the rim of the base to support the outer edge of the cover which allows rotation of the cover relative to the base. Moreover, the sliding joint between the cover and the base around the entire circumference thereof provides centering, interlocking stability and mutual alignment of the cover and the base. The rims take some of the centering pressure off the pivot cylinders and distributes it around the edges of the base and cover.

The cover and base are placed in mutual engagement and allowed to rotate relative to one another about a central axis defined by a bolt 52 threaded into a captivated nut 54. The nut 54 rests at the bottom 58 of a first pivot or depending cylinder 56 extending downward from the flat slopping surface on which the solar panel is retained. A hole is formed in the bottom of the depending cylinder to allow a portion of the bolt 52 to pass into the cylinder and thread with the nut.

A second pivot or base cylinder 60, having an outside diameter less than the outside diameter of the first cylinder 56 and having an inside diameter slightly less than the inside diameter of the first cylinder, extends upwardly from the base to contact the bottom 58 of the depending cylinder. The length of the first and second pivot cylinders are such as to provide support for the cover in addition to the support provided by the engagement of the rims of the cover and base. An annular cap 61 closes off part of the second pivot cylinder to act as a bearing surface for a spring, described below.

Concentric with the first and second pivot cylinders is a third pivot or stop cylinder 62 fixed to the bottom 58 of the first cylinder and extending downward within the interior of the second cylinder 60. A compression spring 64 extends from a washer at the head of the bolt 52 to the annular cap on the base cylinder between the inside of the base cylinder and the outside of the stop cylinder. The combination of the first, second and third pivot cylinders, the bolt and captivated nut and the compression spring provide centering for the cover and base and allow the cover to rotate relative to the base. The lengths of the base cylinder and the stop cylinder from the bottom 58 are such as to provide a uniform tension in the compression spring 64 when the bolt is threaded until the washer stops against the stop cylinder. This provides the desired amount of frictional engagement between the base and cover while still allowing manual rotation of the cover.

The conductors 36 and 38 are sufficiently long to allow rotation of the cover relative to the base about 360°. A pair of posts 64 (FIG. 5; shown in phantom in FIG. 4) extend downwardly on each side of the low battery indicator 46. The posts extend downwardly a distance sufficient to come into contact with walls 66 in the base defining a cavity 68 for accommodating a hinge 70, to be described more fully below. The cover can rotate relative to the base in one direction until the first post contacts the wall of the cavity 68 (FIG. 6). The contact between the post and the wall prevents wrapping of the conductors around the pivot cylinders. The cover can be rotated in the other direction until the second post contacts the opposite wall of the cavity 68. This prevents the conductors from wrapping around the pivot cylinders in the other direction. The full extent of rotation of the cover, however, approaches 360° and allows for almost any desired orientation of the solar panel regardless of the position, in a horizontal plane, of the lamp bulb. This allows for optimum exposure of the solar panel to light rays while still allowing the best possible positioning of the light source for illuminating the selected area of the ground, wall or the like.

The base and cover are made of a suitable plastic. The first, second and third pivot cylinders are dimensioned along with the spring and bolt in such a way as to allow easy manual rotation of the cover while still providing sufficient frictional engagement between the rims and cylinders of the cover and base to keep the cover from rotating when no force is applied to the cover.

The cavity 68 accepts a cylindrical hinge element 70 in a manner which allows the hinge to rotate about a horizontal axis extending from the left to the right side of the base. The cavity defines an inverted round-bottomed trough enclosed at each end by straight sides. The cylindrical hinge element rests and rotates in the trough and is held in place by each side of the trough. The hinge element is rotatably cradled in cusps in the sides of the trough by protrusions on each end of the hinge element. The hinge element is releasably fastened in place in the trough by a bolt 72 and friction nut 74 so that the base and cover can be rotated about the hinge element to change the orientation of the light and solar panel. A slot 76 in the hinge element allows rotation of the hinge element relative to the bolt.

A mounting post 78 is coupled to the hinge element 70 to allow the rechargeable light to be mounted to a light stand 80 which can then be anchored in the ground or to a wall mounting bracket 82 (FIG. 7) for mounting to another suitable support surface.

As shown in FIG. 2, the light stand can be inserted on the mounting post 78 and then used in conjunction with a ground stake 84 so that the rechargeable light can illuminate the ground or walkway, etc. The ground stake preferably includes a plurality of flanges 86 to maintain a stable anchor for the light. The ground stake also has a flat, horizontally extending rim 88 to be placed flush against the ground to provide a low profile for the ground stake and to provide a bearing surface for pushing the ground stake into the ground. After installing the light, the light stand and light can be removed from the ground stake so that the surrounding area can be mowed, trimmed or otherwise maintained.

As shown in FIG. 3, the bolt 72 can be loosened to allow the hinge element to rotate within the cavity 68 to change the planar orientation of the base and cover of the light. This changes the selected area of illumination for the light. It can also be used to change the slant angle of the solar panel as a function of geographic latitude. The bolt can be retightened as desired to fix the orientation of the light.

FIG. 4 shows the slanted solar panel retained in the cover by the panel cover 42. The low battery indicator is centered in front of the solar panel and the posts 64 are shown in phantom on each side.

The wall mount bracket 82 (FIG. 7) includes a rectangular cavity for accepting the mounting post 78 and a pair of slots for accepting the heads of suitable fasteners mounted in a wall or fence for mounting the wall mount bracket to the wall or fence.

The base may include one or more louvers or vents for preventing build-up of humid air inside the cover and base. There may also be provided a labyrinthine path from inside the cover, through a small gap in the gasket 40 and out the top of the cover underneath the upper portion of the panel cover 42. This allows for convective circulation of air through the unit and prevents accumulation of humid air inside the housing.

Although the present invention has been described in detail with reference only to the presently preferred embodiments, it will be appreciated by those of ordinary skill in the art that various modifications can be made without departing from the invention. Accordingly, the invention is limited only by the following claims.

We claim:

1. A solar rechargable light assembly comprising:
  a substantially planar base;
  a lamp mounted in the planar base in a fixed position for illuminating a selected area such as the ground or a wall in a direction away from the base;
  a mount releasably fixed on the base for mounting the light assembly to a support such as the ground or a wall;
  an electrical storage device and power supply for supplying electric current to the lamp;
  a cover mounted to a side of the base opposite the lamp and rotatable relative to the base through an angle less than 360°; and
  a solar panel fixed to the cover at an angle slanted relative to the planar base to face away form the base and electrically coupled to the electrical storage device for charging the storage device when the solar panel is exposed to light, and wherein current from the storage device illuminates the lamp.

* * * * *